United States Patent [19]

Nakamura

[11] Patent Number: 4,532,982
[45] Date of Patent: Aug. 6, 1985

[54] HEAT EXCHANGING SYSTEM FOR A HEAT ENGINE

[75] Inventor: Hiromi Nakamura, Chiba, Japan

[73] Assignee: Mitsubishi Gas Chemical Company, Inc., Tokyo, Japan

[21] Appl. No.: 520,755

[22] Filed: Aug. 8, 1983

Related U.S. Application Data

[63] Continuation of Ser. No. 271,935, Jun. 9, 1981, abandoned.

[30] Foreign Application Priority Data

Jun. 11, 1980 [JP] Japan .................................. 55-78808

[51] Int. Cl.³ ............................ F02C 3/20; F02G 1/00
[52] U.S. Cl. ...................................... 165/1; 60/39.55; 60/39.461
[58] Field of Search ................ 237/11, 12.1; 60/39.46, 60/39.55, 39.59, 39.53; 165/1; 122/26, 20 B

[56] References Cited

U.S. PATENT DOCUMENTS

| | | | |
|---|---|---|---|
| 2,959,005 | 11/1960 | Zaba | 60/39.53 |
| 3,167,913 | 2/1965 | Muhlberg et al. | 60/39.53 |
| 3,731,485 | 5/1973 | Rudolph et al. | 60/39.53 |
| 4,149,585 | 4/1979 | Sterlini | 165/1 |
| 4,264,826 | 4/1981 | Ullmann | 122/26 |
| 4,281,511 | 8/1981 | Neale | 60/39.53 |

FOREIGN PATENT DOCUMENTS

60902 12/1954 France .
457039 7/1968 Switzerland .

*Primary Examiner*—Henry Bennett
*Attorney, Agent, or Firm*—Cushman, Darby & Cushman

[57] ABSTRACT

A heat exchanging system for a heat engine wherein compressed air alone or gas including air as the main part thereof is used as a gaseous combustion supporting medium, working mixture or the like, said system is characterized in that heat recovery is accomplished by a utilization of a gaseous or mistlike mixture which is obtained by adding liquid phase water to a part of or the whole of said compressed gas or contacting said water with said gas, or heat recovery is accomplished while adding liquid phase water thereto or contacting it therewith.

5 Claims, 2 Drawing Figures

HEAT EXCHANGING SYSTEM FOR A HEAT ENGINE

This is a continuation of application Ser. No. 271,935, filed June 9, 1981, now abandoned.

FIELD OF THE INVENTION

The present invention relates to a novel heat exchanging system for a heat engine, and more particularly, to a heat exchanging system wherein compressed air or gas including air as the main part thereof is used as a gaseous combustion supporting medium, motive fluid or the like, said system being characterized in that heat regeneration or heat recovery is accomplished by utilization of a mixture which is obtained by adding liquid phase water to a part of or the whole of said compressed gas or contacting said water with said gas, or with adding liquid phase water thereto or contacting it therewith.

BACKGROUND OF THE INVENTION

In a heat engine wherein compressed air or gas including air as the main part thereof (this will be referred hereafter to as "air") is used as a gaseous combustion supporting medium, motive fluid or the like (this will be referred to hereafter as "gaseous medium"), air serves as a combustion supporting medium as well as working mixture or motive fluid. Usually, an excess of air which is several times or more as necessity to burn is supplied.

The heat exchanging system of the present invention make it possible to recover heat from a heat engine with high thermal efficiency. The novel heat exchanging system is combined with heat cycle so that the partial pressure of the steam in the compressed air is increased, and this steam acts as a substantial part of the motive fluid which reduces the quantity of air to be compressed which means less energy is required for compression as well as improving of theremal effectiveness.

In other words, the present invention provides a heat exchanging system for a heat engine in which water is contacted with or added to a part of or the whole of the compressed air, and thus a heat engine cycle such as gas turbine cycle and a Rankine cycle are carried out at the same time.

In order to make it easy to understand we will describe the present invention in accordance with only the gas turbine engine.

DESCRIPTION OF THE PRIOR ART

In the prior art, recovery of heat in exhaust gas of a gas turbine cycle is carried out by recovery of preheating of compressed air or vaporized heat medium by use of a boiler which uses exhausted heat, or recovery of refrigeration energy by means of absorption refrigeration cycle.

The recovery of heat energy in exhaust gas is one of the important factors in improving the thermal efficiency not only of gas turbine engines but also in all heat engines.

The recovery of heat energy in the exhaust gas of the gas turbine cycle by means of preheating of air is one of the most commonly used methods. However, this method has the following disadvantage.

First the air is compressed adiabatically so that the temperature of the air may, depending upon the compression ratio, rise to 200° C. or higher, or sometimes to 300° C. or higher. The temperature of the discharged gas becomes the above mentioned high temperature of compressed gas plus logarithmic mean temperature difference (LMTD) of regenerator, i.e. 30° C.-50° C., so it is impossible to recover heat from the heat engine at such thermal level and, therefore the amount of recovered heat is significantly limited.

Second, the heat transfer coefficient is low since in the present type of regenerator—the so called "gas-gas type regenerator—, there is a pressure loss due to the necessity of a large heat surface area. The large heat surface area lowers thermal efficiency and also increases the cost of the equipment.

There are several methods in which the heat energy in exhaust gas of gas turbine cycle is recovered by means of the exhaust heat boiler which uses heat medium, however, the efficiency of these methods depends on the possibility of using the recovered heat energy.

If there is no demand for all for the recovered heat energy, this energy is generally transformed into another form of energy by Rankine cycle using a vaporized heat medium. This method, which is generally called "combined cycle of gas turbine-steam turbine", has the disadvantage that transfer of heat energy to heat medium through boiler heated by exhaust heat is accompanied with loss of heat so that effective energy decreases. If the heat load is to be restricted to a certain level, the quantity of recovered heat energy is restricted. Generally speaking, the thermal level of heat recovered from exhaust gas is too low to enable getting high transformation efficiency.

There is an additional disadvantage in that additional costs such as cost of heat medium itself, cost of equipment for said heat medium, pressurizing and cooling equipment for environmental protection and high operating costs are required.

There is another method of recovering heat energy in exhaust gas of gas turbine cycle which is carried out by using an absorbing-type refrigerator to obtain refrigeration energy. However, if refrigeration energy is not available, this method also has many problems. As power transformation (conversion) by means of the combined cycle of gas turbine-cycle and refrigeration cycle is essentially the same as the combined cycle of gas turbine cycle and Rankine cycle, improvement of thermal efficiency could not be expected in result.

SUMMARY OF THE INVENTION

The object of the present invention is to provide a heat engine with high thermal efficiency by means of a novel and improved heat exchanging system and heat engine without the demerits of the conventional method of heat recovery for exhaust gas.

The present invention accomplishes the above-mentioned objects by using a system wherein recovery of thermal energy in exhaust gas of heat engine using compressed air as gaseous medium is carried out by adding water to or contacting water with a part of or the whole of compressed air in a combination of the heat engine cycle such as gas turbine cycle and Rankine cycle.

It is appreciated from the above description that present invention could be considered as an integration of a heat engine cycle such as gas turbine cycle and Rankine cycle; however, it should be noted that the following detailed description is based only on a gas turbine cycle for the sake of easy understanding.

For a further understanding of the nature and advantages of the present invention, reference should be made to the remaining portions of the specification and to the attached drawings.

DESCRIPTION OF THE PREFERRED EMBODIMENT

Figure 1:
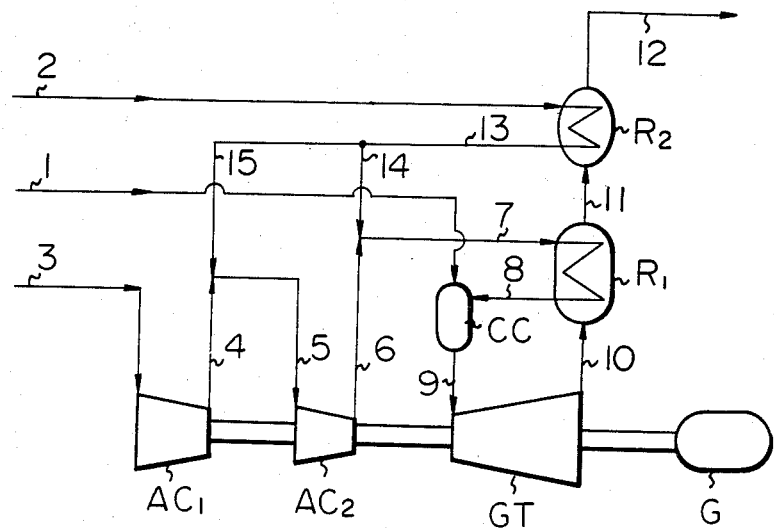
FIG. 1 is a schematic block diagram of a preferred embodiment according to the present invention.

FIG. 1 shows a preferred embodiment according to the present invention which comprises two-step heat regeneration two-step air compression, a one-step combustion chamber, and a one-step output turbine.

Air is admitted to the first air compressor $AC_1$ through absorbing conduit 3 and is compressed adiabatically, causing temperature and the pressure thereof to rise; thereafter, the air is discharged from outlet conduit 4 as a intermediate-step compressed gas. Water under pressure is preheated by a regenerator $R_2$ through conduit 2, and is introduced into conduit 14 and 15 through conduit 13, and further introduced into compressed gas 6 and intermediate-step compression gas 4, respectively.

Introduction of water may be accomplished by mixing water with compressed air in a mixing apparatus to vaporize it or by introducing the water directly into conduits 5, 7 or further into a regenerator $R_1$, whereupon mixing water with compressed air, vaporization of water and fall of air temperature occur. Gas into which water is injected is admitted to the second air compressor $AC_2$ by means of an absorbing conduit 5. In this stage it is preferable that there be no liquid phase water. Air which is compressed adiabatically by the second air compressor $AC_2$ is mixed with water passing through the conduit 14 by means of the outlet conduit 6, and is admitted into the regenerator $R_1$. In the regenerator $R_1$, heat recovery is carried out by means of sensible heat transfer with rising of temperature when liquid phase water does not exist at the gas side thereof, and heat recovery is carried out by means of both latent heat transfer with evaporation of water and sensible heat transfer with rising of temperature when liquid phase water coexists with air. Gaseous medium which is already recovered in the regenerator $R_1$ is then admitted into the combustion chamber CC through conduit 8. The combustion chamber CC is provided with fuel through conduit 1, and compressed gas functions as a gaseous working mixture such as combustion supporting medium, refrigerant, diluent or the like and the temperature thereof is elevated to the predetermined value by combustion of fuel, and is admitted into output gas turbine GT through conduit 9. Gas expands adiabatically in the output gas turbine and produces work, a part of said work being adapted to be consumed in the first and the second air compressor $AC_1$, $AC_2$ and the remainder thereof being adapted to be recovered as the driving force of working machine. Exhaust gas from the output turbine passes to the regenerator $R_1$ thorugh conduit 10 and is subjected to heat recovery at high temperature level in this place; further it is subjected to secondary heat recovery in the regenerator $R_2$ through conduit 11 at middle or low temperature level. Heat which is recovered from the exhaust gas is discharged to atmosphere through conduit 12.

Figure 2:
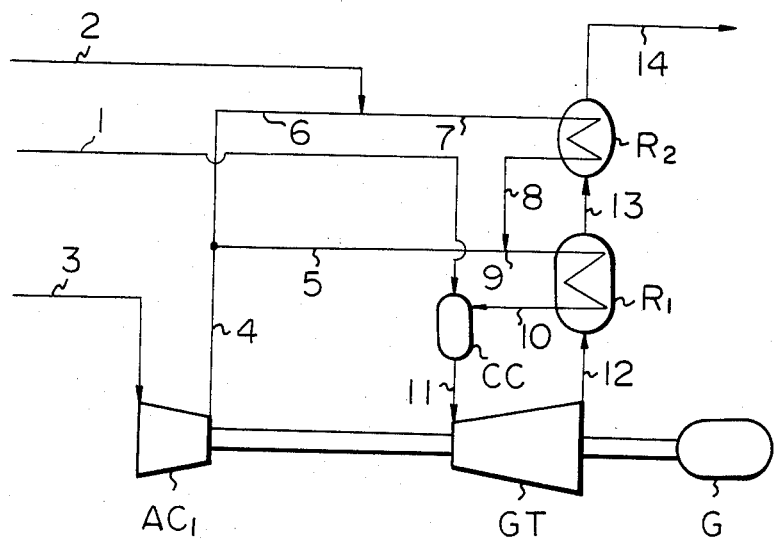
FIG. 2 is a schematic block diagram of another embodiment according to the present invention.

FIG. 2 is another embodiment of the present invention comprising 2-step heat regeneration, 1-step air compression, 1-step combustion and 1-step output turbine, the features of this embodiment is that regeneration of exhaust gas at lower temperature level is carried out by mixture of a part of compressed gas and liquid phase water.

Air is admitted to the air compressor $AC_1$ through absorbing conduit 3 and is compressed adiabatically, causing temperature and pressure thereof to rise, thereafter it is discharged from conduit 4. A part of this compressed and heated air is introduced into conduit 6 and is mixed with water from conduit 2 to make an air/water-steam mixture. This mixture is subjected to heat exchange from exhaust gas in regenerator $R_2$ at lower temperature level so that the mixture becomes an air/steam mixture. The air/steam mixture is introduced into conduit 8 and is mixed with the remaining of compressed air in conduit 5, then is subjected again to heat exchange in regenerator $R_1$ at higher temperature level. The heat recovered mixture is introduced into combustion chamber CC where it burns fuel from conduit 1 and becomes motive fluid at predetermined temperature. The mixture is thereafter introduced into the out put turbine GT and expanded adiabatically to drive the air compressor $AC_1$ and a working machine such as a generator G and then is discharged from conduit 12. This discharged gas is subject to heat exchange in the regenerator $R_1$ at higher temperature level and further heat exchange in regenerator $R_2$ at lower temperature level to lower pressure of discharged gas up to the atmospheric pressure, and finally is exhausted from the system through conduit 14.

The features of the present invention are, as is apparent from the accompanying drawings, that heat recovery is accomplished by the system comprising mixture which is obtained by contacting compressed air with water or adding compressed air to water, and said mixture of compressed air and water is heated by combustion of fuel so as to use fuel as heated working mixture and therefore, the output turbine or piston is energized, which in turn produces driving work, a part of which is used to pressurize air.

Although the above description of the present invention refers to a gas turbine as preferred embodiment, it should be noted that the present invention could be adapted to any kind of heat engine if it is accompanied with heat recovery functions using compressed gas. For example, it is apparent that a piston engine which is provided with a piston for compressing gas, a mechanism for injecting water into said compressed gas, a regenerator for exhaust gas using a mixture of compressed gas and water, and an output piston accompanyied with combustion chamber or both a combustion and turbine has substantially the same functions as those of the previously described gas turbine cycle.

From the above-mentioned features, the construction of a heat engine embodying the present invention is accompanied with the following advantages.

Firstly, while air is generally compressed adiabatically the air compressed adiabatically has low percentage of humidity to saturated humidity. Thus, air is added to or contacted with water so that the water changes to steam, which results in the falling of air temperature with an increase in the quantity of steam occurring adiabatically. In this point, while the relation between the decrease in volume due to the fall of temperature and increase of volume due to the increase of moles depends upon compression ratio or temperature condition, there is some condition where PV value could be selected at smaller value if water is contacting with or being added to compressed air. This means that a multi-step compression system wherein water is contacted with or added at intermediate steps so that temperature of the system is lowered and a quantity of steam is increased, can decrease the power for compression more than one-step compression wherein air is compressed adiabatically. This decrease in energy required for compression is a primary advantage of the present invention, and the decrease in energy required for elevating pressure brings about an increase in output, which results in improved thermal efficiency.

Second, while energy required for elevating pressure decreases, the quantity of compressed gas becomes large corresponding to the increase of steam. An excess of air over the amount of air indispensable for complete combustion is used as a gaseous working mixture in the gas turbine cycle, as described above, and the increased amount of steam in the compressed gas makes it possible to decrease the quantity of air to be elevated in pressure. Furthermore, the specific heat of steam is 0.515 Kcal/Kg°C. (mean specific heat of 25°–1,000° C.) and the specific heat of air is 0.262 Kcal/Kg°C. (mean specific heat of 25°–1,000° C.); therefore the effect of steam as a working mixture is roughly two times that of air. Thus, the decrease in amount of air to be compressed is in proportion to the difference in specific heat between them. This results in a significant decrease in the quantity of air to be compressed and therefore a second advantage of the present invention is that both energy required for compressing air and the whole weight of gaseous working mixture decrease. This improvement of thermal efficiency makes it possible to increase output with a more compact unit.

In another embodiment of the present invention, heat transfer is carried out in an system in which liquid phase water and gas coexist. Water has the property of increasing saturated pressure progressively up to the critical point and the change thereof is shown in table 1.

TABLE 1

| Temperature (°C.) | Saturated pressure (ata) |
|---|---|
| 100 | 1.03 |
| 125 | 2.37 |
| 150 | 4.35 |
| 175 | 9.10 |
| 200 | 15.86 |
| 225 | 26.00 |
| 250 | 40.56 |

The operating pressure of gas turbine cycle is generally at from several ata to 30 ata, and it should be understood that the maximum quantity of steam which may be included in a mixture of compressed air and water wherein liquid phase water is added to or contacted with air at said pressure and partial pressure of steam therein is saturated pressure described in above-mentioned Table 1. For example, a quantity of saturated steam (mol %) under 9 ata and 30 ata in operation pressure is shown in table 2.

TABLE 2

| Temperature (°C.) | Operation pressure | |
|---|---|---|
| | 9 ata | 30 ata |
| 100 | 11.4 | 3.43 |
| 125 | 26.3 | 7.90 |
| 150 | 53.9 | 16.2 |
| 175 | ∞ | 30.3 |
| 200 | ∞ | 52.9 |
| 225 | ∞ | 86.7 |

TABLE 2-continued

| Temperature (°C.) | Operation pressure | |
|---|---|---|
| | 9 ata | 30 ata |
| 250 | ∞ | ∞ |

From Table 2, it is apparent that the capability of heat recovery by means of evaporation of water at low temperature level such as 100°–150° C. is large when air and liquid phase water co-exist. The third advantage of the present invention is that the capability of heat recovery by means of evaporation of water at a low temperature level is large, which permits the system of the present invention to recover heat up to the low temperature level and acts to improve the thermal efficiency.

Further, the heat recovery in the present invention is carried out by both latent heat transfer through evaporation of water and by sensible heat transfer through elevating of temperature of the whole system. In general, the heat exchanger with latent heat transfer is expected to have a high coefficient of heat transfer. The fourth advantage of the present invention is that high velocity of heat transfer is obtained which effects compactness of the regenerator.

Further, in a heat recovery system wherein latent heat transfer through evaporation of water and sensible heat transfer through the elevation of temperature of the whole system such as coexistence system of air and liquid phase water, it is possible to reduce the drop in temperature level as provision of a convective-type heat exchanger raises the temperature of the whole system. This is the fifth advantage of the present invention, which is significantly different from the recovery of heat through evaporation of one substance alone. This advantage improves thermal efficiency by reducing the loss of effective energy.

The present invention has still another advantage wherein perfect exhaust gas or heat which could no more be recovered for work is exhusted into atmosphere or environment as mixture gas of combustion gas, air and steam. In the heat recovery system using heat medium or the like, a cooling system for discharge of heat is necessary in order to recirculate the heat medium, and this additional equipment, such as storage cavity for heat medium and for operation, adds to the cost. However, in the present invention it is very easy to discharge heat directly into a cold body.

Another advantage of the present invention is the decrease of NOx which is included in the exhaust gas. Generally speaking, the higher the maximum temperature in the combustion chamber, the higher the thermal efficiency of heat engine such as a turbine. But the elevation of temperature normally causes the concentration of NOx in exhaust gas to increase. It is well known to those skilled in the art that in a system in which water and air coexist the concentration of NOx decreases, so the present invention has the effect of decreasing NOx. Thus, if the concentration of NOx to be permitted is substantially the same, the thermal efficiency of the present invention is improved significantly by elevating the maximum temperature.

As described above in detail, the present invention provides a heat engine which may be considered as an integration of heat engine such as gas turbine cycle and Rankine cycle, and wherein compressed air or gas including air in the main part thereof is used as combustion supporting medium or working mixture, liquid phase water is contacted with or added to said gas to recover heat so that the system is combined therewith in order to support the heat exchanging system.

CALCULATION 1

The effect of addition or contact of water

In order to examine the effect of addition or contact of water, air of 20° C. and 65% humidity is compressed adiabatically by either one-step or two-step compressor, and water is added to said air at between sequential steps, and the mixture is compressed up to 9 ata. The following data is obtained from the above mentioned examination.

TABLE 3

|  | one-step compression | two-step compression |
|---|---|---|
| air inlet | | |
| dry air Kg mol/sec | 1.25 | 1.25 |
| steam kg mol/sec | 0.01846 | 0.01846 |
| first step discharge | | |
| pressure ata | — | 3.135 |
| temperature °C. | — | 148 |
| water | | |
| pressure ata | — | 10.0 |
| temperature °C. | — | 100 |
| quantity Kg mol/sec | — | 0.08032 |
| temperature of system after addition of water °C. | — | 63 |
| second step discharge | | |
| pressure ata | — | 9 |
| temperature °C. | 306 | 195 |
| quantity of gas Kg mol/sec | 1.26846 | 1.34878 |
| necessary work KWH/H | 10840 | 10110 |
| ratio of work to a compressed mol | 1.28 | 1.00 |

CALCULATION 2

Efficiency as heat engine:

In order to examine ratio of heat recovery and thermal efficiency, the system of two step compression in said Calculation 1 is used as the compression step as it is; thus, heat recovery of added water is carried out at the regenerator $R_2$ is the appended FIG. 1, and this water is then added to the first outlet and second outlet, respectively. Table 4 shows the data thereof.

TABLE 4

| air inlet | dry air | 1.25 | Kgmol/sec |
|---|---|---|---|
| | steam | 0.01846 | Kgmol/sec |
| water | temperature at inlet | 20° | C. |
| | temperature of added water | 100° | C. |
| | 1st step addition | 0.08032 | Kgmol/sec |
| | 2nd step addition | 0.08603 | Kgmol/sec |
| | total quantity of addition | 10.8 | T/H |
| turbine inlet | pressure | 9 | ata |
| | temperature | 1000° | C. |
| waste gas | temperature | 190° | C. |
| | quantity of flow | 1.4557 | Kgmol/sec |
| fuel and output | fuel (heavy oil A) | 0.635 | Kg/sec |
| | output | 12270 | KWH/H |

$$\text{heat efficiency} = \frac{12270 \times 860 \times 100}{0.635 \times 10860 \times 3600} = 42.5\%$$

CALCULATION 3

In order to examine the efficiency of a heat engine wherein heat recovery is carried out by a mixture which is obtained by adding water to a part of compressed air and by mixing them thereafter, the flow of attached FIG. 2 is referred to. In FIG. 2, heat recovery is carried out in the regenerator $R_2$ through mixture of a part of compressed gas and added water thereto, and this heated gas and the remaining compressed gas are mixed so that heat recovery is carried out in the regenerator $R_1$. Table 5 shows the data thereof.

TABLE 5

| air inlet | dry air | 1.0 | Kgmol/sec |
|---|---|---|---|
| | steam | 0.0151 | Kgmol/sec |
| compressed air | temperature | 225° | C. |
| | bypass to regenerator $R_2$ | 20% | |
| water | temperature | 20 | C. |
| | quantity of addition | 9.7 | T/H |
| regenerator | $R_2$ LMTD | 59.4° | C. |
| | $R_1$ LMTD | 46.9° | C. |
| turbine inlet | pressure | 6 | ata |
| | temperature | 1000° | C. |
| waste gas | temperature | 95° | C. |
| | volume of flow | 1.1797 | Kg/sec |
| fuel and output | fuel (heavy oil A) | 0.427 | Kg/sec |
| | output | 8240 | KWH/H |

$$\text{thermal efficiency} = \frac{8240 \times 860 \times 100}{0.427 \times 10200 \times 3600} = 45.2\%$$

The improvement of efficiency of heat engine such as gas turbine cycle is a very important problem under the conditions of environmental pollution, lack of fossil fuel and a rise in fuel price and, therefore, the present invention is of great significance in that it improves the thermal efficiency of heat engines remarkably by providing a new and improved method which uses air and liquid phase water.

What is claimed is:

1. A heat exchange method wherein a part of a compressed gas from compressor means is fed to a first heat exchange means and a separate part of the compressed gas from the compressor means is fed to a second heat exchange means operating at a temperature that is lower than said first heat exchange means, the improvement comprising the step of adding water to said separate part of the compressed gas to form a mixture of compressed gas, steam and liquid water and feeding said mixture to said second heat exchange means where the water in said mixture will absorb a large quantity of heat from said second heat exchange means through evaporation thereof, the mixture then being mixed with the first part of the compressed gas so as to recover heat in the first heat exchange means.

2. The method set forth in claim 1 wherein the compressed gas comprises mixed gas including air as the major part thereof.

3. The method set forth in claim 1 wherein said liquid phase water is preheated before addition for use as a heat recovering medium.

4. The method as set forth in claim 1 wherein the compressed gas is air.

5. A heat exchange method as claimed in claim 1 wherein said compressed gas is used as a gaseous combustion supporting medium and wherein further heat recovery at a low temperature level is accomplished where said compressed gas is air and including the step of contacting the liquid phase water with a part of said compressed air.

* * * * *